United States Patent
Yai et al.

(10) Patent No.: US 8,670,652 B2
(45) Date of Patent: Mar. 11, 2014

(54) COMPUTER-READABLE RECORDING MEDIUM THAT RECORDS RESERVATION INSTRUCTIONS, RECORDING RESERVATION METHOD AND RECORDING RESERVATION DEVICE

(75) Inventors: Yuki Yai, Kawasaki (JP); Masashi Urushihara, Kawasaki (JP); Takashi Terasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 12/553,298

(22) Filed: Sep. 3, 2009

(65) Prior Publication Data
US 2010/0086281 A1 Apr. 8, 2010

(30) Foreign Application Priority Data
Oct. 2, 2008 (JP) .................................. 2008-257189

(51) Int. Cl.
*H04N 5/761* (2006.01)
(52) U.S. Cl.
USPC ........................................................ 386/291
(58) Field of Classification Search
USPC .......................................... 386/248, 249, 291
See application file for complete search history.

(56) References Cited

U.S. PATENT DOCUMENTS

| | | | |
|---|---|---|---|
| 5,526,127 A | 6/1996 | Yonetani et al. | |
| 6,608,930 B1 | 8/2003 | Agnihotri et al. | |
| 6,614,930 B1 | 9/2003 | Agnihotri et al. | |
| 6,731,788 B1 | 5/2004 | Agnihotri et al. | |
| 2005/0120371 A1 | 6/2005 | Kimura et al. | |
| 2005/0185931 A1 | 8/2005 | Isozaki et al. | |
| 2005/0289595 A1* | 12/2005 | Nakamura et al. | 725/45 |
| 2006/0029369 A1* | 2/2006 | Ohde et al. | 386/83 |
| 2007/0014405 A1 | 1/2007 | Kikuchi et al. | |
| 2007/0038765 A1* | 2/2007 | Dunn | 709/229 |
| 2008/0124046 A1* | 5/2008 | Hiramatsu et al. | 386/95 |
| 2009/0328107 A1 | 12/2009 | Kimura et al. | |

FOREIGN PATENT DOCUMENTS

| | | |
|---|---|---|
| CN | 1295690 A | 5/2001 |
| CN | 158607 A | 2/2005 |
| CN | 1586071 A | 2/2005 |
| CN | 1681305 A | 10/2005 |
| CN | 101188722 | 5/2008 |
| GB | 2 295 714 A | 6/1996 |
| JP | 06-103641 | 4/1994 |
| JP | 2004-112622 | 4/2004 |
| JP | 2004-120408 | 4/2004 |
| JP | 2004-120408 A | 4/2004 |

(Continued)

OTHER PUBLICATIONS

European Search Report mailed Aug. 4, 2011 in corresponding European Patent Application 09169771.4.
Chinese Office Action issued Feb. 11, 2011 in corresponding Chinese Patent Application 200910175723.4.
$2^{nd}$ Notification of Office Action, mailed Dec. 6, 2011, in corresponding Chinese Application No. 200910175723.4 (14 pp.).

(Continued)

*Primary Examiner* — Thai Tran
*Assistant Examiner* — William Tran
(74) *Attorney, Agent, or Firm* — Staas & Halsey LLP

(57) ABSTRACT

A television PC 40 detects an advertisement of a program scheduled to be broadcasted from within pictures based on TV signals transmitted by any one of TV broadcasting stations, then acquires program information for specifying this program (S101-S107), and registers reservation information based on the program information according to an instruction given from a viewer of the pictures in a reservation information management table 43d, thereby reserving the recording of the program (S108, S109).

21 Claims, 11 Drawing Sheets

(56) References Cited

FOREIGN PATENT DOCUMENTS

| JP | 2006-115228 | 4/2006 |
| JP | 2007-208599 | 8/2007 |
| JP | 2007-208599 A | 8/2007 |
| JP | 2007-274493 | 10/2007 |
| JP | 2008-131413 | 6/2008 |

OTHER PUBLICATIONS

Notice of Reason for Rejection issued Jun. 5, 2012 in corresponding Japanese Patent Application No. 2008-257189 (3 pages) (4 pages English translation).

Notice of Reason for Rejection mailed Mar. 26, 2013 in corresponding Japanese Patent Application No. 2008-257189 (3 pages) (English Translation 4 pages).

* cited by examiner

FIG. 4

43d: RESERVATION INFORMATION MANAGEMENT TABLE

| SCHEDULE DATE | START | TIME | CHANNEL | TITLE | TEMPORARY RESERVATION |
|---|---|---|---|---|---|
| 20/11/26 | 21:00 | 00:54 | 8 | JOURNEY OF GALILEI | OFF |
| 20/11/27 | 19:56 | 00:58 | 12 | HEAD FAMILY! MANPUKU-YA (FULL-STOMACH STORE) | OFF |
| 20/11/28 | 21:00 | 00:54 | 10 | DEKU-NO-BO (FATHEAD) | ON |
| 20/11/29 | 21:00 | 00:54 | 6 | TYAPATU SENSEI (TEACHER WITH BROWN-DYED HAIR) | OFF |
| 20/11/30 | 22:00 | 00:54 | 4 | MAI-HIME (DANCING GIRL) | OFF |

COMPUTER-READABLE RECORDING MEDIUM THAT RECORDS RESERVATION INSTRUCTIONS, RECORDING RESERVATION METHOD AND RECORDING RESERVATION DEVICE

CROSS-REFERENCE TO RELATED APPLICATIONS

This application is based upon and claims the benefit of priority of the prior Japanese Patent Application No. 2008-257189, filed on Oct. 2, 2008, the entire contents which are incorporated herein by reference.

FIELD

This case relates to a computer-readable recording medium that records reservation program (reservation program includes instructions), a method and a device for reserving recording that is executed by a recording unit which saves pictures based on TV signals as video data on a recording medium.

BACKGROUND

As broadly known, a TV broadcasting station in a private sector broadcasts an advertisement at an interval of broadcasting programs. The advertising broadcast is called a CM [Commercial Message], a TV commercial and a CF [Commercial Film], in which details thereof are advertisements of commercial articles or services provided to consumers by general enterprises and public relations (PR) of a government etc in many cases, however, the advertising broadcast might be an advertisement of a program scheduled to be broadcasted.

A viewer of the TV broadcast can, when a favorite (program) is contained in the advertisements of the broadcasted programs, view this favorite program in a way that stores a broadcast schedule time and date and a channel of broadcasting the program advertisement which are notified during the program advertisement, and manually designates the broadcast schedule time and date and the channel with the aid of a recording function of a recording device (video recorder) or a so-called television personal computer or searches for the relevant program from within a TV program guide based on EPG [Electronic Program Guide] information to thereby reserve the recording of the advertised program.

The manual operation of designating the broadcast schedule time and date and the channel and the operation of searching for the relevant program from within the TV program guide are highly time-consuming to the viewers.

[Patent document 1] Japanese Patent Laid-Open Publication No. 2007-208599

[Patent document 2] Japanese Patent Laid-Open Publication No. 2004-120408

SUMMARY

According to an aspect of the embodiment, a computer-readable recording medium includes a computer-readable recording medium that records reservation program for reserving recording that is executed by recording unit to saving a picture based on television signals as video data on a recording medium, makes a computer function as: acquiring unit to acquire program information for specifying an advertised program from within the picture based on the television signals of any one of channels; and registering unit to register reservation information based on the program information acquired by the acquiring unit in a reservation information management table stored with the reservation information containing information for specifying a time and date and a channel at which the recording unit perform the recording.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram schematically illustrating a reservation information management table.

DESCRIPTION OF EMBODIMENTS

A television (TV) system will hereinafter be described by way of an embodiment of this case with reference to the accompanying drawings.

<<Configuration>>

Figure 1:
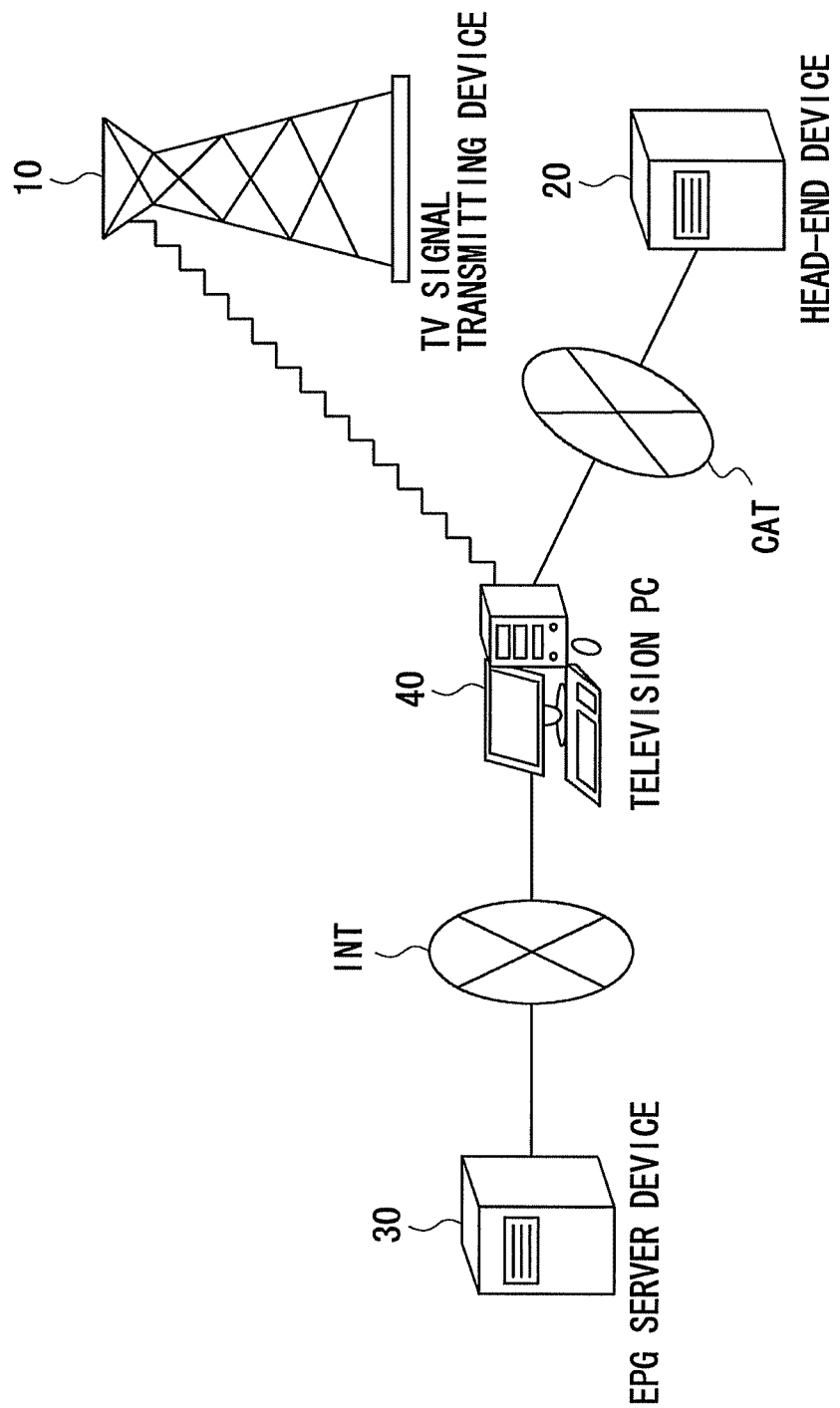
FIG. 1 is a diagram of an architecture of a television system in an embodiment.

FIG. 1 is a diagram of a configuration of the TV system in the embodiment.

The TV system in the embodiment includes a TV signal transmitting device 10, a head-end device 20, an EPG [Electronic Program Guide] server device 30, and a personal computer (which will hereinafter be abbreviated to television PC) 40 with a TV function. Among these components, the television PC 40 is connected to the head-end device 20 via a CATV [Community Antenna TeleVision] network CAT and also connected to the EPG server device 30 via the Internet INT.

The TV signal transmitting device 10 is a device for broadcasting TV signals in the form of radio waves and is installed within a facility of a TV broadcasting station. Note that the TV signals broadcasted from the TV signal transmitting device 10 may be superimposed with, as EPG signals, EPG information containing program information related to programs scheduled to be broadcasted by the TV broadcasting station.

The head-end device 20 is a device for transmitting the TV signals received via a community antenna from the TV broadcasting station to the CATV network CAT, and is installed within a facility of a cable TV broadcast business operator.

Note that if the head-end device 20 is classified as a pass-through type which does not alter the TV signals received by the community antenna, it follows that the EPG information superimposed as the EPG signals on the TV signals reach the receiving side as they are. Further, when the head-end device 20 is classified as a transmodulation type which alters the TV signals received by the community antenna, the TV signals transmitted from the head-end device 20 may be superimposed with the original EPG information, as the EPG signals, of the cable TV broadcasting operator.

The EPG server device 30 is a device for providing a Web client with the EPG information containing program information on the programs that the respective TV broadcasting stations are scheduled to broadcast. The EPG server device 30, upon receipt of a request from the Web client through the Internet INT, transmits the EPG information via the Internet INT to the Web client.

Note that the EPG includes a function for an unillustrated TV receiver to display the electronic program guide (EPG) on a screen on the basis of the EPG information described above. Moreover, the EPG information, through not illustrated, as broadly known, has the program information containing at least a broadcast starting time and date, broadcasting time, a channel number and a program title on a per-program basis.

Figure 2:
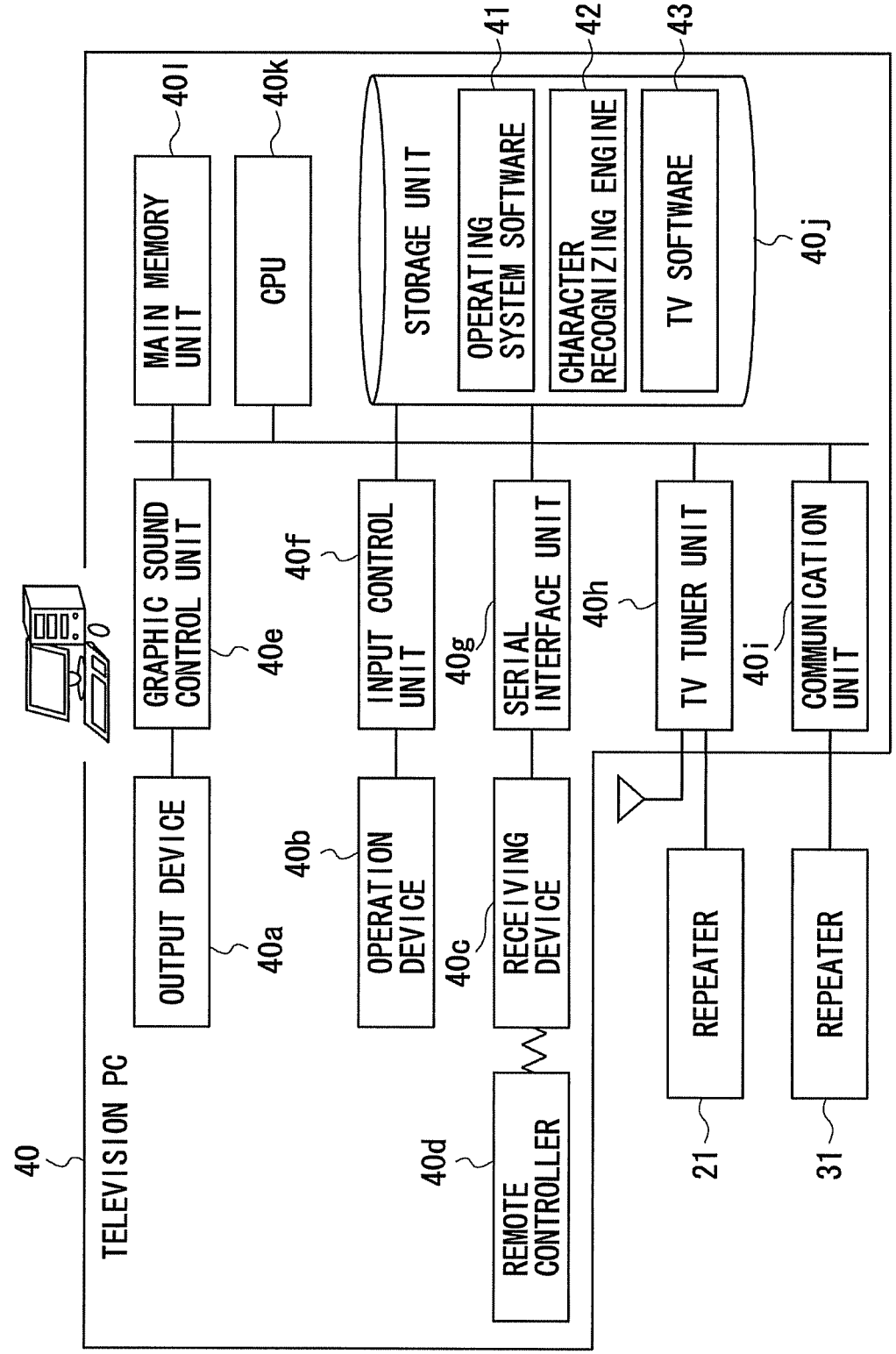
FIG. 2 is a diagram of a configuration of a television PC.

FIG. 2 is a diagram of a configuration of the television PC 40.

The television PC 40 is the PC with an addition of the TV function for viewing and recording contents broadcasted from the TV broadcasting station. The television PC 40 includes an output device 40a such as a liquid crystal display etc with a loudspeaker, an operation device 40b such as a keyboard and a mouse, a receiving device 40c which receives an operation signal in an optical wireless or radio wireless mode, and a main body to which these devices 40a-40c are connected. The main body includes, as built-in components, a graphic sound control unit 40e, an input control unit 40f, a serial interface unit 40g, a TV tuner unit 40h, a communication unit 40i, a storage unit 40j, a CPU [Central Processing Unit] 40k and a main memory unit 40l.

The graphic sound control unit 40e is a unit for generating audiovisual signals based on audiovisual data transferred from the CPU 40k, and outputting audiovisual signals to the output device 40a. The input control unit 40f is a unit for accepting the operation signal from the operation device 40b and notifying the CPU 40k of this operation signal.

The serial interface unit 40g is a unit for transferring and receiving the data to and from an external device according to the serial communication standards which are exemplified by USB [Universal Serial Bus], RS-232C or IEEE [Institute of Electrical and Electronic Engineers] 1394. The serial interface unit 40g is connected to the receiving device 40c via a predetermined communication cable.

The TV tuner unit 40h is a unit for receiving the TV signals of a plurality of channels from the TV signal transmitting device 10 and the head-end device 20, and extracting and digitizing the TV signals of a viewing target channel. The TV tuner unit 40h is connected to a TV antenna equipped in a general type of house via a coaxial cable, and also connected to a repeater 21 within the CATV network CAT through a CATV cable. Note that the TV tuner unit 40h is a built-in TV tuner card as an attachable/detachable adaptor (extension card) in the main body of the television PC 40 and may also be, in terms of carrying out this case, a TV tuner box connecting with the serial interface unit 40g. Further, the TV tuner unit 40h may also be provided with hardware functioning as an encoder which compresses the audiovisual data acquired by digitizing the TV signals in a format enabling the data to be reproduced on the personal computer. The encoder is exemplified such as an MPEG [Moving Picture Experts Group] encoder. Incidentally, when the TV tuner unit 40h is classified into a type including none of the hardware functioning as the encoder such as this, it is required that software functioning as the encoder be installed into the storage unit 40j which will be described later on.

The communication unit 40i is a unit for transferring and receiving the data to and from other computers on the Internet INT. The communication unit 40i is exemplified by an Ethernet (trademark of Xerox Corp., U.S.A.) card, an FC [Fiber Channel] card, an ATM [Asynchronous Transfer Mode] card, a token ring card and an FDDI [Fiber-Distributed Data Interface] card. The communication unit 40i is connected to the repeater 21 in the Internet INT via the network cable. Note that a switching hub or a router is given as the repeater 21.

The storage unit 40j is a unit for recording various categories of programs and various items of data on a recording medium in a readable manner. The storage unit 40j is exemplified by a solid-state drive, a hard disk drive, a DVD [Digital Versatile Disk] drive, a +R/+RW drive or a BD [Blu-ray Disc] drive. Further, the recording medium is exemplified by a nonvolatile semiconductor memory (flash memory), a hard disk, a DVD (including a DVD-R [Recordable], a DVD-RW [Rewritable], a DVD-ROM [Read Only Memory], a DVD-RAM [Random Access Memory]), a +R/+RW, or a BD (including a BD-R, a BD-RE [Rewritable]).

The CPU 40k is a unit which executes a process based on the program within the storage unit 40j. The main memory unit 40l is a unit used for the CPU 40k to cache the program and the data and to develop an operation area.

In the television PC 40, the storage unit 40j is stored with at least operating software 41, character recognizing software 42 and TV software 43.

The operating software 41 is software for providing an API [Application Programming Interface] and an ABI [Application Binary Interface] to a variety of applications, managing the storage areas of the storage unit 40j and the main memory unit 40l, managing processes and tasks, managing files, providing utility applications such as a variety of setting tools and editors, and allocating windows to a plurality of tasks for multiplexing a screen output. Further, the operating software 41 includes an unillustrated interface program. The unillustrated communication interface program is a program for transferring and receiving the data to and from the communication interface program of one other computer connected via the communication unit 40i. The unillustrated communication interface program is exemplified by a TCP/IP [Transmission Control Protocol/Internet Protocol] stack.

The character recognizing software 42 is software for acquiring the image data from an image generating apparatus like a scanner, and generating text data by distinguishing the characters from the images based on the acquired image data. The character recognizing software 42 includes a character recognizing engine as a core program group thereof. The character recognizing engine includes a function of executing a character recognizing process about the image data given from another application and returning the text data to this application.

Figure 3:
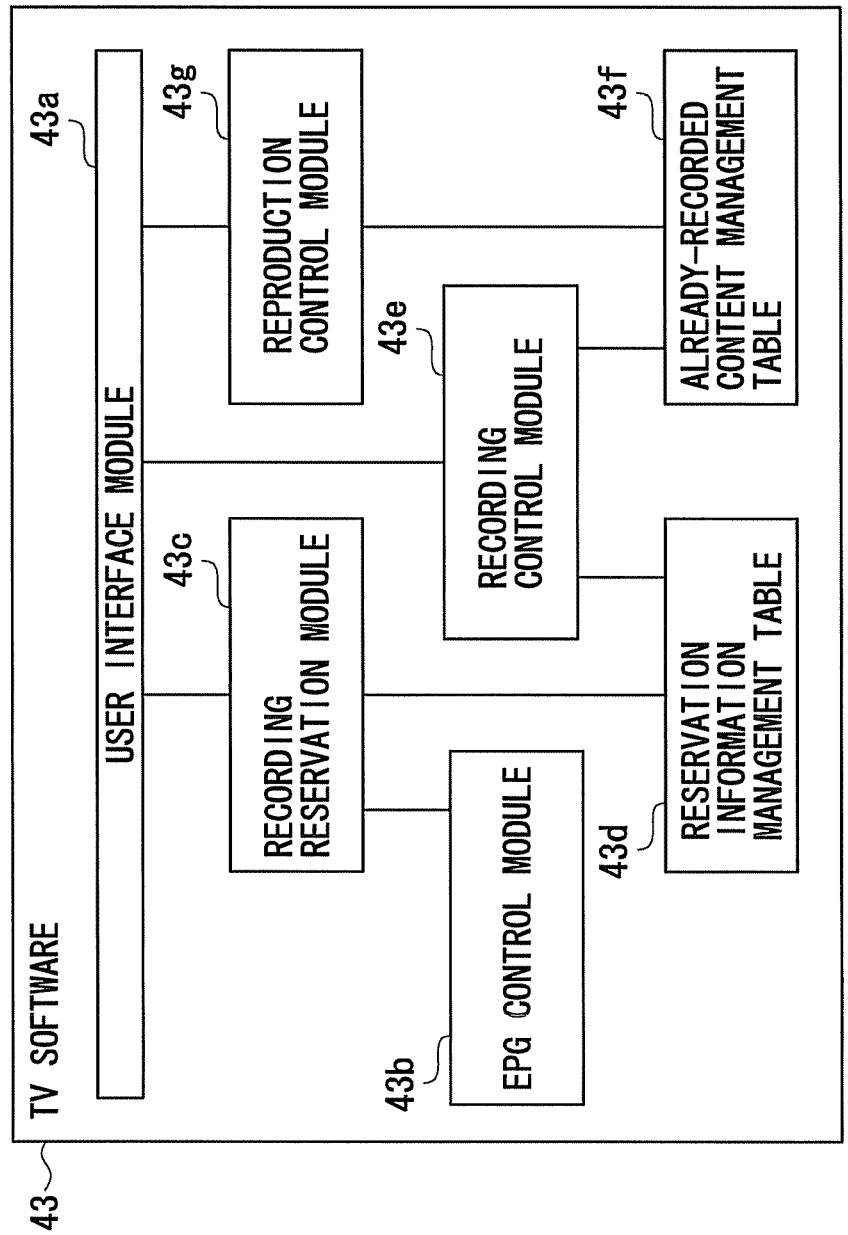
FIG. 3 is a diagram of a configuration of television software.

FIG. 3 is a diagram of a configuration of the TV software 43.

The TV software 43 is software for adding, to the personal computer, a TV function for viewing and recording the contents broadcasted from the TV broadcasting station. The TV software 43 includes a user interface module (program) 43a, an EPG control module (program) 43b, a recording reservation module (program) 43c, a reservation information management table 43d, a recording control module 43e, an already-recorded content management table 43f and a reproduction control module 43g.

The user interface module 43a is a module for accepting, from the operator (user) via a predetermined GUI [Graphical User Interface], requests for displaying a list of the programs scheduled to be broadcasted, reserving a record of the TV program, projecting an in-broadcasting content, starting and stopping the record of the in-broadcasting content, reproducing the recorded content and changing over the setting information that will be explained later on, and for giving instructions to the recording reservation module 43c, the recording control module 43e or the reproduction control module 43g.

The EPG control module 43b is a module for, when accepting the requests from the operator via the user interface module 43a and the recording reservation module 43c, acquiring the TV signals from the TV signal transmitting device 10 or the head-end device 20 or acquiring the EPG information from the EPG server device 30. The user interface module 43a described above, when receiving the EPG information via the recording reservation module 43c from the EPG control module 43b, displays on the output device 40a the electronic program guide (EPG) containing the plurality of programs in a selection-enabled mode on the basis of the plural pieces of program information contained in the EPG information.

The recording reservation module 43c is a module which reserves the record of the program selected by the operator from within the electronic program guide via the user interface module 43a, and reserves the record of the content specified by the starting time and date and the channel designated by the operator via the user interface module 43a.

The reservation information management table 43d is a table for managing, as reservation information, the information on the record reserved by the recording reservation module 43c. FIG. 4 is a diagram schematically illustrating the reservation information management table 43d. Each record in the reservation information management table 43d includes a [schedule date] field, a [start] field, a [time] field, a [channel] field, a [title] field and a [temporary reservation] field. The [schedule date] field is a field in which to record a schedule date (year/month/date) when the record may be done. The [start] field is a field recorded with the starting time when the record may be started. The [time] field is a field in which to record the recording time defined as a length of the time when performing the record. The [channel] field is a field recorded with a channel number at which the record may be done. The [title] field is a field recorded with a title of the program of which is recorded. Incidentally, the [title] field is blanked with respect to the record reserved by the operator who designates the schedule date, the starting time, the time (recording time) and the channel. The [temporary reservation] field is a field recorded with temporary reservation information representing that the record is temporarily reserved by a program which will be explained later on. Note that when the record is reserved through the electronic program guide and reserved by designating the schedule date, the starting time, the time (recording time) and the channel, the [temporary reservation] field is blanked.

Each of the records in the reservation information management table 43d has, other than the fields described above, fields with, e.g., a caption of details of the program, a list of performers and a genre of the program.

The recording control module 43e illustrated in FIG. 3 is a module which generates audiovisual data about an in-broadcasting content and records the generated data by storing the data in the storage unit 40j. More specifically, the recording control module 43e, when instructed by the operator to start recording the in-broadcasting content via the user interface module 43a, executes the start of the recording, then, when instructed to stop recording, executes the stop of the recording, and adds the record of the content to the already-recorded content management table 43f which will be explained later on. Moreover, the recording control module 43e records the content reaching the starting time and date (specified by the schedule date and starting time) in the items of reservation information registered in the reservation information management table 43d but having no addition of the temporary reservation information. Further, the recording control module 43e, when stopping the recording, adds the record (entry) of the content to the already-recorded content management table 43f, and deletes the reservation information on this recording from the reservation information management table 43d.

The already-recorded content management table 43f is a table for managing the contents stored as the audiovisual data in the storage unit 40j. Each of the records in the already-recorded content management table 43f includes, though not illustrated, fields recorded with a file name, a recording date, record starting time, recording time, a channel and a title, respectively.

The reproduction control module 43g is a module which presents, to the operator, the information on the contents registered in the already-recorded content management table 43f via the user interface module 43a in the selection-enabled mode, and executes reproducing the content designated by the operator from within the presented contents. Further, the reproduction control module 43g is also the module which immediately outputs the in-broadcasting content of the channel designated by the operator in the in-broadcasting contents to the output device 40a.

Figure 5:
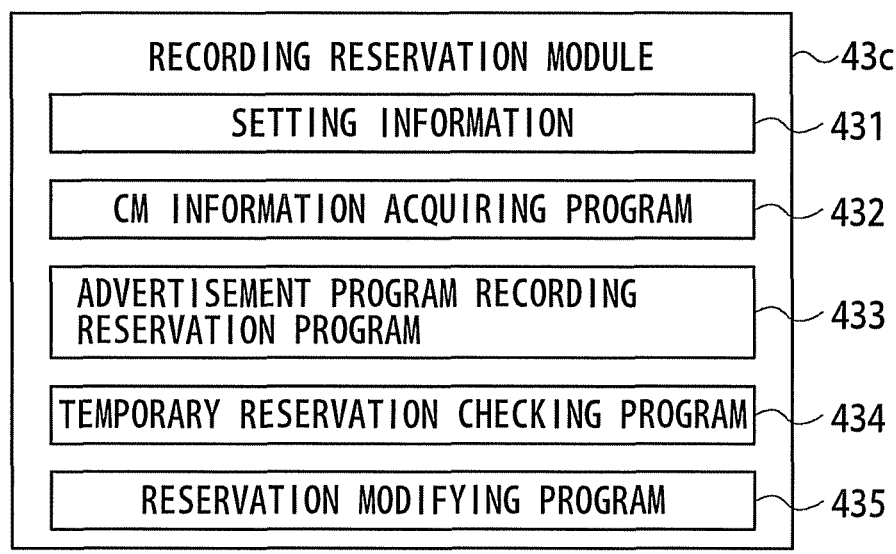
FIG. 5 is a diagram of a configuration of a recording reservation module.

By the way, in the embodiment, as illustrated in FIG. 5, the recording reservation module 43c includes setting information 431, a CM [Commercial Message] information acquiring program 432, an advertisement program recording reservation program 433, a temporary reservation checking program 434 and a reservation modifying program 435.

The setting information 431 is information for defining whether a function (which will be described later on) of automatically detecting a program advertisement from within the contents broadcasted by the TV broadcasting station is effective or ineffective. The setting information 431 is recorded in, e.g., the storage unit 40j, and the details thereof (indicting whether the auto detecting function is effective or ineffective) are, as described above, changed over by the operator via the user interface module 43a.

The CM information acquiring program 432 is a program for periodically acquiring the CM information through the Internet INT from an unillustrated Web server and saving the CM information in the storage unit 40j in an overwrite mode. The CM information is information on an advertisement broadcasted at an interval of broadcasting the program by the TV broadcasting station, and contains a CM type representing a difference between the advertisement sponsored by a general type of enterprise, a government, etc and the program advertisement of the TV broadcasting station, a broadcasting date, broadcasting time and a channel. Further, the CM information further contains, when the CM type represents the program advertisement, a title of the program related to this program advertisement.

The advertisement program recording reservation program 433 is a program for detecting the program advertisement from within the content broadcasted by the TV broadcasting station and reserving the recording of the program related to this program advertisement. Details of the process executed by the CPU 40k according to this advertisement program recording reservation program 433 will be described later on with reference to FIGS. 6 through 10.

The temporary reservation checking program 434 is a program for checking whether the reservation is changed over to a formal reservation on the basis of the EPG information with respect to the recording temporarily reserved by the advertisement program recording reservation program 433. Details of the process executed by the CPU 40k according to this temporary reservation checking program 434 will be described later on with reference to FIG. 11.

The reservation modifying program 435 is a program for changing, when the broadcasting time of the program reserved for the recording is changed due to a convenience of the TV broadcasting station, the reservation information in the reservation information management table 43d. Details of the process executed by the CPU 40k according to this reservation modifying program 435 will be described later on with reference to FIG. 12.

<<Process>>
<Reservation for Recording Advertisement Program>

In the television PC 40 in the embodiment, the TV software 43 is started up, and, when the in-broadcasting content of the channel designated by the operator in the in-broadcasting contents (audiovisual data) starts being immediately output to the output device 40a, the CPU 40k reads the advertisement program recording reservation program 433 from the storage unit 40j and starts an advertisement program recording reservation process.

Figure 6:
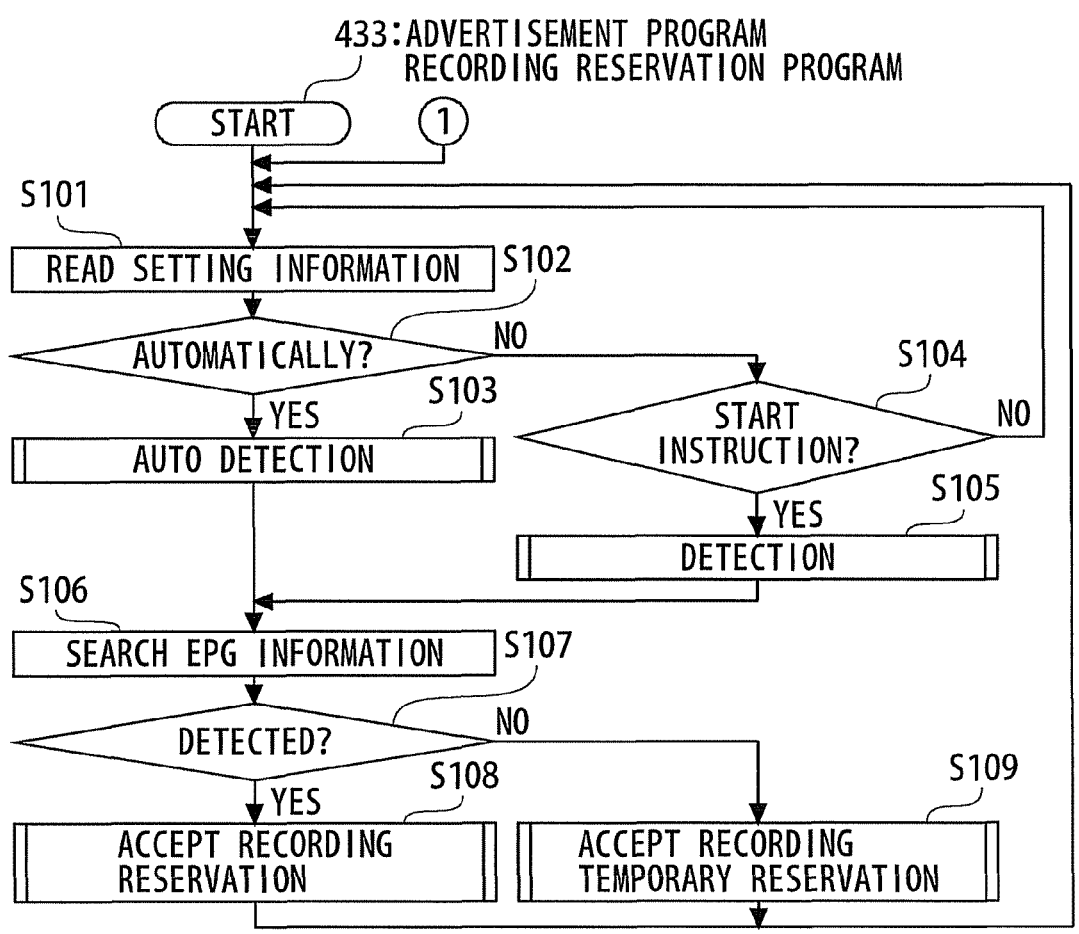
FIG. 6 is a flowchart illustrating a flow of an advertisement program recording reservation process.

FIG. 6 is a diagram illustrating a flow of the advertisement program recording reservation process.

After starting the advertisement program recording reservation process, in first step S101, the CPU 40k reads the setting information 431.

In next step S102, the CPU 40k determines from the setting information 431 read in step S101 whether the program advertisement auto detecting function is effective or not. Then, when it is defined based on the setting information 431 read in step S101 that the program advertisement auto detecting function is effective, the CPU 40k advances the process to step S103.

In step S103, the CPU 40k invokes and executes an auto detection subroutine.

Figure 7:
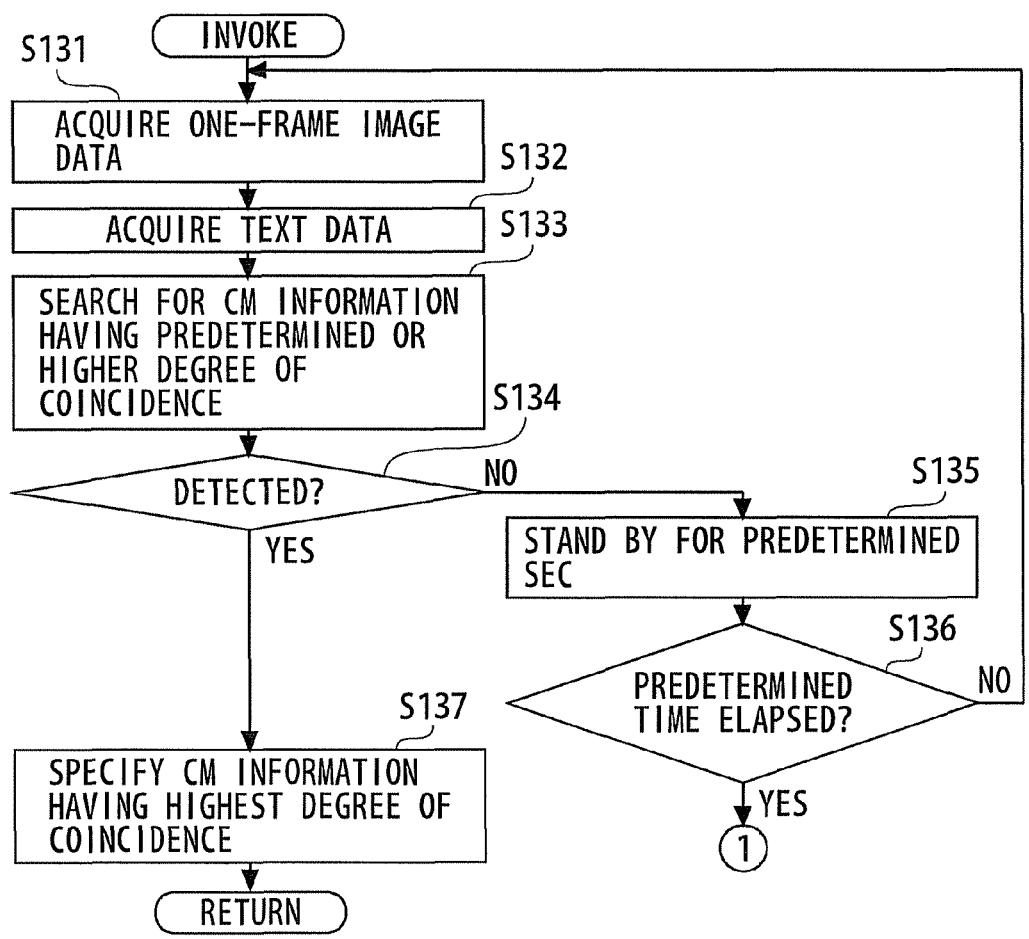
FIG. 7 is a flowchart illustrating a flow of an auto detection subroutine.

FIG. 7 is a flowchart illustrating the auto detection subroutine.

After starting the auto detection subroutine, in first step S131, the CPU 40k acquires image data of one-frame image from within a plurality of frames of images which form a picture (video) output to the output device 40a.

In next step S132, the CPU 40k obtains text data from the image data acquired in step S131. To be specific, the CPU 40k hands over the image data to the character recognizing engine of the character recognizing software 42 and gets the character recognizing engine to execute a character recognizing process, thereby acquiring the text data as a result thereof from the character recognizing engine.

In next step S133, the CPU 40k searches for the CM information containing the CM type that indicates the program advertisement and having a predetermined or higher degree of coincidence with the text data obtained in step S132 from within the items of CM information acquired by the advertisement program recording reservation program 433. Herein, the "degree of coincidence" is a degree calculated based on the number of coincident keywords in a plurality of keywords extracted from the respective comparative targets. A method of calculating the degree of coincidence is broadly known as described in, e.g., Japanese Patent Laid-Open Publication No. 2005-092491, and hence its description is omitted.

In next step S134, the CPU 40k determines whether or not the CM information is detected in the search made in step S133. Then, when the CM information is not detected in the search made in step S133, the CPU 40k diverts the process to step S135 from step S133.

In step S135, the CPU 40k stands by till a predetermined second (e.g., 1 sec) elapses, and thereafter advances the process to step S136.

In step S136, the CPU 40k determines whether or not there is the elapse of the predetermined time since the auto detection subroutine in FIG. 7 has been started. Then, when the predetermined time elapses since the start of the auto detection subroutine in FIG. 7, the CPU 40k exits the auto detection subroutine in FIG. 7, and loops the process back to step S101 of the advertisement program recording reservation process in FIG. 6. Whereas when the predetermined time does not elapse since the start of the auto detection subroutine in FIG. 7, the CPU 40k loops the process back to step S131 and executes the process of acquiring the image data.

While on the other hand, when the CM information is detected by the search in step S133 in FIG. 7, the CPU 40k advances the process to step S137 from step S134.

In step S137, the CPU 40k specifies the CM information having the highest degree of coincidence with the text data acquired in step S132 in the pieces of CM information detected by the search in step S133. Thereafter, the CPU 40k terminates the auto detection subroutine in FIG. 7, then returns to the advertisement program recording reservation process in FIG. 6, and advances the process to step S106.

On the other hand, when the setting information 431 read in step S101 in FIG. 6 defines that the auto detecting function of the program advertisement, the CPU 40k diverts the process to step S104 from step S102.

In step S104, the CPU 40k determines whether or not a predetermined instruction is given from the operator via an operating device 40b or a remote controller 40d. Then, when the predetermined instruction is not given from the operator via the operating device 40b or the remote controller 40d, the CPU 40k diverts the process from step S104 back to step S101. Whereas when the predetermined instruction is given from the operator via the operating device 40b or the remote controller 40d, the CPU 40k advances the process to step S105.

In step S105, the CPU 40k invokes and executes a detecting subroutine.

Figure 8:
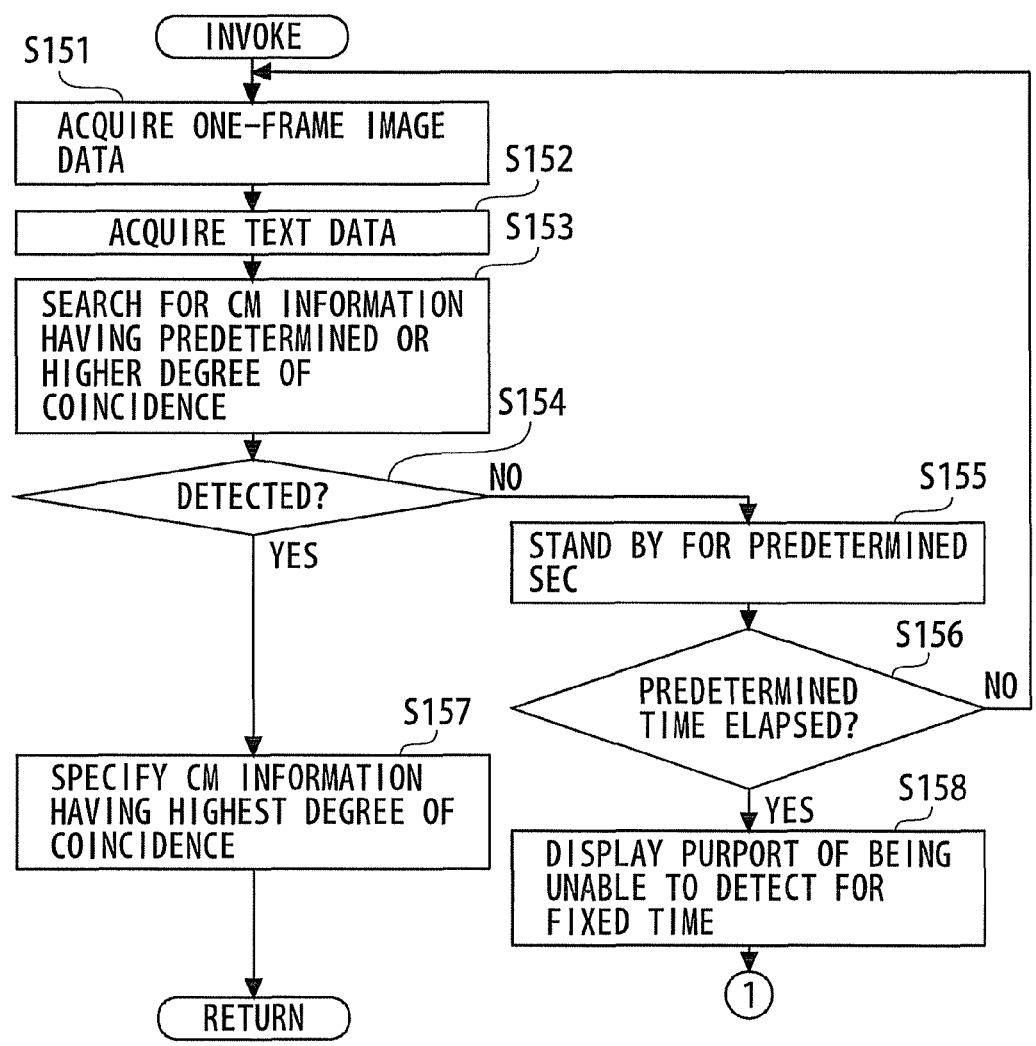
FIG. 8 is a flowchart illustrating a flow of a detection subroutine.

FIG. 8 is a flowchart illustrating a flow of the detection subroutine.

As apparent from a comparison between FIG. 8 and FIG. 7, steps S151 through S157 of the detection subroutine in FIG. 8 includes the same details of steps S131 through S137 of the auto detection subroutine in FIG. 7.

Then, when there is not detected the CM information containing the CM type which indicates the program advertisement and having the predetermined or higher degree of coincidence with the text data acquired from the image data till the predetermined time has elapsed since the start of the detection subroutine in FIG. 8, the CPU 40k advances the process to step S158 from step S156.

In step S158, the CPU 40k displays a purport that the program advertisement can not be detected since the start of the detection subroutine in FIG. 8 on the output device 40a for a predetermined period of time. Thereafter, the CPU 40k exits the detection subroutine in FIG. 8, and loops the process back to step S101 of the advertisement program recording reservation process in FIG. 6.

While on the other hand, when there is detected the CM information containing the CM type which indicates the program advertisement and having the predetermined or higher degree of coincidence with the text data acquired from the image data till the predetermined time has elapsed since the start of the detection subroutine in FIG. 8, the CPU 40k advances the process to step S157 from step S154, then specifies the CM information having the highest degree of coincidence with the text data acquired in step S152, thereafter terminates the detection subroutine in FIG. 8, and advances the process to step S106 of the advertisement program recording reservation process in FIG. 6.

In step S106, the CPU 40k searches through the EPG information, in which the conditions for search are the broadcasting date, the broadcasting time, the channel and the program title that are contained in the CM information specified in step S103 or S105.

In step S107, the CPU 40k determines whether or not the program information can be detected from the EPG information by the search in step S106. Then, when the program information can be detected from the EPG information by the search in step S106, the CPU 40k advances the process to step S108.

Note that the CPU 40k executing steps S131 through S137 and steps S106, S107 corresponds to the acquiring unit described above. Similarly, the CPU 40k executing steps S151 through S157 and steps S106, S107 corresponds to the acquiring unit described above.

In step S108, the CPU 40k invokes and executes a recording reservation accepting subroutine.

Figure 9:
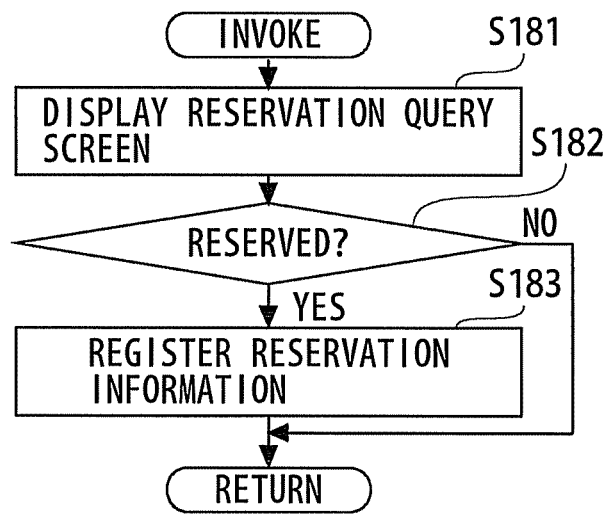
FIG. 9 is a flowchart illustrating a flow of a recording reservation accepting subroutine.

FIG. 9 is a flowchart illustrating a flow of the recording reservation accepting subroutine.

After starting the recording reservation accepting subroutine, in first step S181, the CPU 40k displays a reservation query screen on the output device 40a. The reservation query screen includes, though not illustrated, the program information detected by the search in step S106, and also includes a pair of buttons (a reservation button, a wait-and-see button) for making the selection of whether the recording of the program specified by the program information is reserved or not. Then, the CPU 40k, when any one of the pair of buttons on the reservation query screen is selected, advances the process to step S182.

Note that the CPU 40k executing step S181 corresponds to querying unit.

In step S182, the CPU 40k determines whether the selected button is the reservation button or not. Then, when the selected button is not the reservation button (in the case of the wait-and-see button), the CPU 40k diverts the process from step S182, then terminates the recording reservation accepting subroutine in FIG. 9, returns to the advertisement program recording reservation process in FIG. 6, and loops the process back to step S101. Whereas when the selected button is the reservation button, the CPU 40k advances the process to step S183.

In step S183, the CPU 40k registers the program information detected by the search in step SLOG as the reservation information in the reservation information management table 43d in FIG. 4. Thereafter, the CPU 40k finishes the recording reservation accepting subroutine in FIG. 9, then returns to the advertisement program recording reservation process in FIG. 6, and loops the process back to step S101.

Note that the CPU 40k executing steps S182 and S183 corresponds to the registering unit described above.

While on the other hand, when the program information can not be detected from the EPG information by the search in step S106, the CPU 40k diverts the process to step S109 from step S107.

In step S109, the CPU 40k invokes and executes a recording temporary reservation accepting subroutine.

Figure 10:
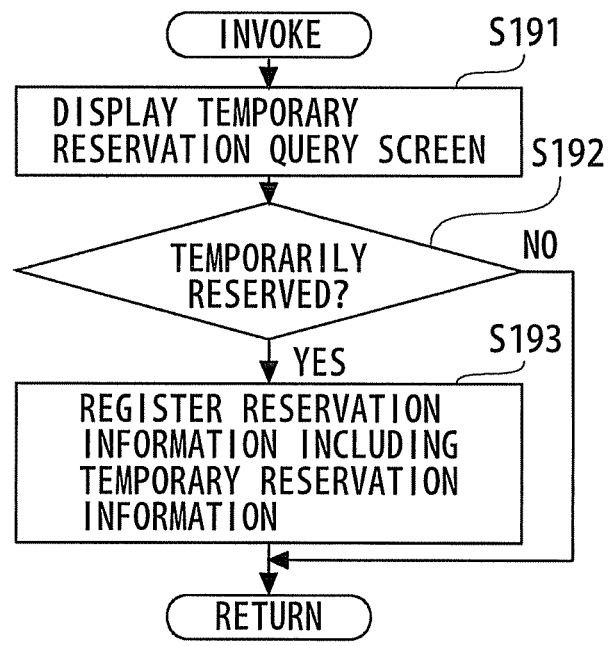
FIG. 10 is a flowchart illustrating a flow of a recording temporary reservation accepting subroutine.

FIG. 10 is a flowchart illustrating a flow of the recording temporary reservation accepting subroutine.

After starting the recording temporary reservation accepting subroutine, in first step S191, the CPU 40k displays a temporary reservation query screen on the output device 40a. The temporary reservation query screen includes, though not illustrated, the broadcasting date, the broadcasting time, the channel and the program title of the CM information specified in step S103 or S105, and also includes a pair of buttons (a temporary reservation button, a wait-and-see button) for making the selection of whether the recording of the program specified by the broadcasting date, the broadcasting time, the channel and the program title is reserved or not. Then, the CPU 40k, when any one of the pair of buttons on the temporary reservation query screen is selected, advances the process to step S192.

Note that the CPU 40k executing step S191 corresponds to query unit.

In step S192, the CPU 40k determines whether or not the selected button is the temporary reservation button. Then, when the selected button is not the temporary reservation button (in the case of the wait-and-see button), the CPU 40k diverts the process from step S192, then terminates the recording temporary reservation accepting subroutine in FIG. 10, returns to the advertisement program recording reservation process in FIG. 6, and loops the process back to step S101. Whereas when the selected button is the temporary reservation button, the CPU 40k advances the process to step S193.

In step S193, the CPU 40k adds the temporary reservation button to the CM information specified in step S103 or S105, which contains the broadcasting date, the broadcasting time, the channel and the program title, and registers thus-organized reservation information in the reservation information management table 43d in FIG. 4. Thereafter, the CPU 40k finishes the recording temporary reservation accepting subroutine in FIG. 10, then returns to the advertisement program recording reservation process in FIG. 6, and loops the process back to step S101.

Note that the CPU 40k executing steps S192, S193 corresponds to the registering unit described above.

<Temporary Reservation Check>

In the television PC 40 according to the embodiment, in the status of starting up the TV software 43, periodically (e.g., once a day) or each time the EPG information is updated, the CPU 40k reads a temporary reservation check program and executes the temporary reservation check process.

Figure 11:
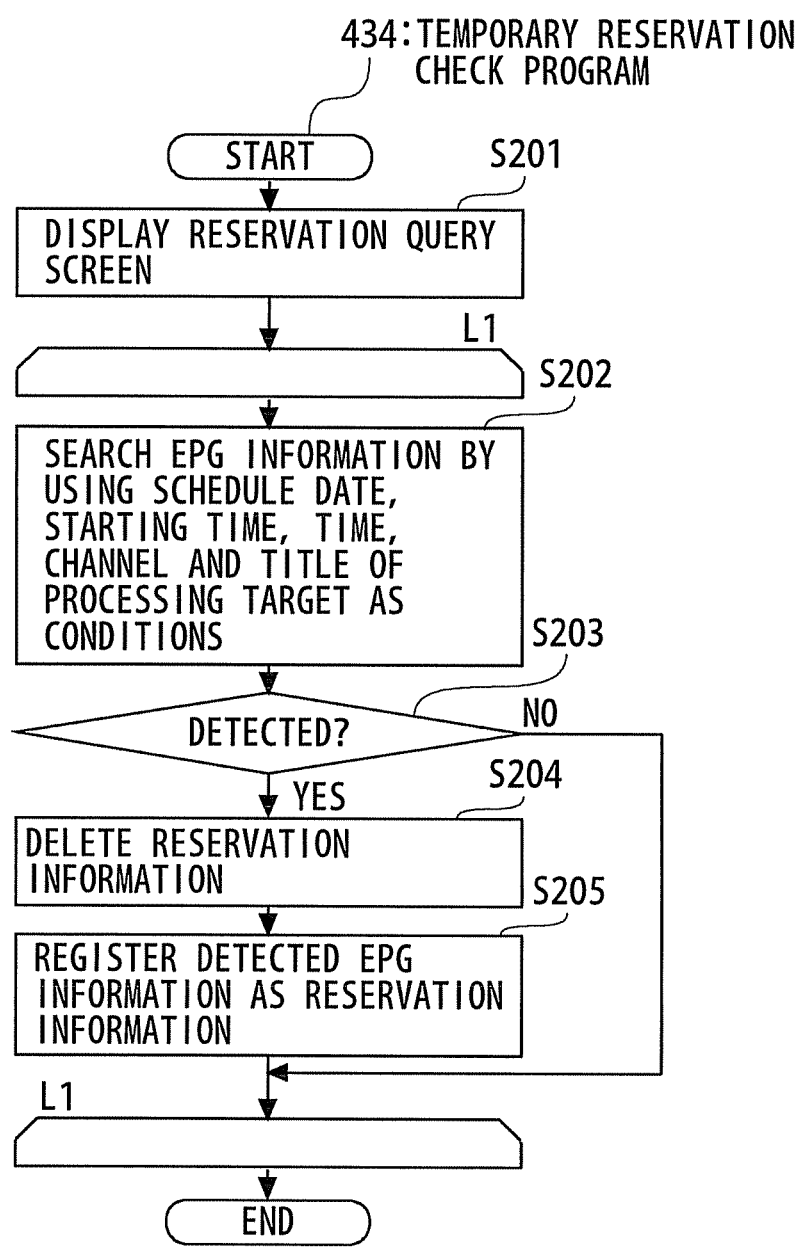
FIG. 11 is a flowchart illustrating a flow of a temporary reservation check process.

FIG. 11 is a flowchart illustrating the temporary reservation check process.

After starting the temporary reservation check process, in first step S201, the CPU 40k extracts a record containing the temporary reservation information from the reservation information management table 43d. Thereafter, the CPU 40k executes a first processing loop L1.

In the first processing loop L1, the CPU 40k executes a process consisting of steps S202 through S204 sequentially with respect to each of the records extracted in step S201.

In step S202, the CPU 40k searches through the EPG information in which the conditions for search are the schedule date, the starting time, the time, the channel and the title in the processing target record.

In next step S203, the CPU 40k determines based on the result of the search in step S202 whether the program information can be detected from the EPG information or not. Then, when the program information can not be detected from the EPG information, the CPU 40k diverts the process from step S203, and finishes this round of the processing target in the first processing loop L1. The recording reservation related to the processing target record is, it follows, thereby kept intact as the temporary reservation. On the other hand, when the program information can be detected from the EPG information, the CPU 40k advances the process to step S204 from step S203.

In step S204, the CPU 40k deletes the processing target record, i.e., the reservation information from the reservation information management table 43d in FIG. 4.

In next step S205, the CPU 40k registers, as the reservation information, the EPG information detected by the search in step S202 in the reservation information management table 43d of FIG. 4. It follows that the recording reservation related to the processing target record is thereby reregistered as the formal reservation from the temporary reservation. Thereafter, the CPU 40k finishes this round of the processing target in the first processing loop L1.

Note that the CPU 40k executing the step S205 corresponds to reregistering unit.

The CPU 40k, after executing the process consisting of steps S202 through S204 with respect to all of the records extracted in step S201, exits the first processing loop L1, and finishes the temporary reservation check process in FIG. 11.

<Modification of Reservation>

In the television PC 40 of the embodiment, in the status of starting up the TV software 43, periodically (e.g., once a day) or each time the EPG information is updated, the CPU 40k reads a reservation modifying program 435 and executes a reservation modifying process.

Figure 12:
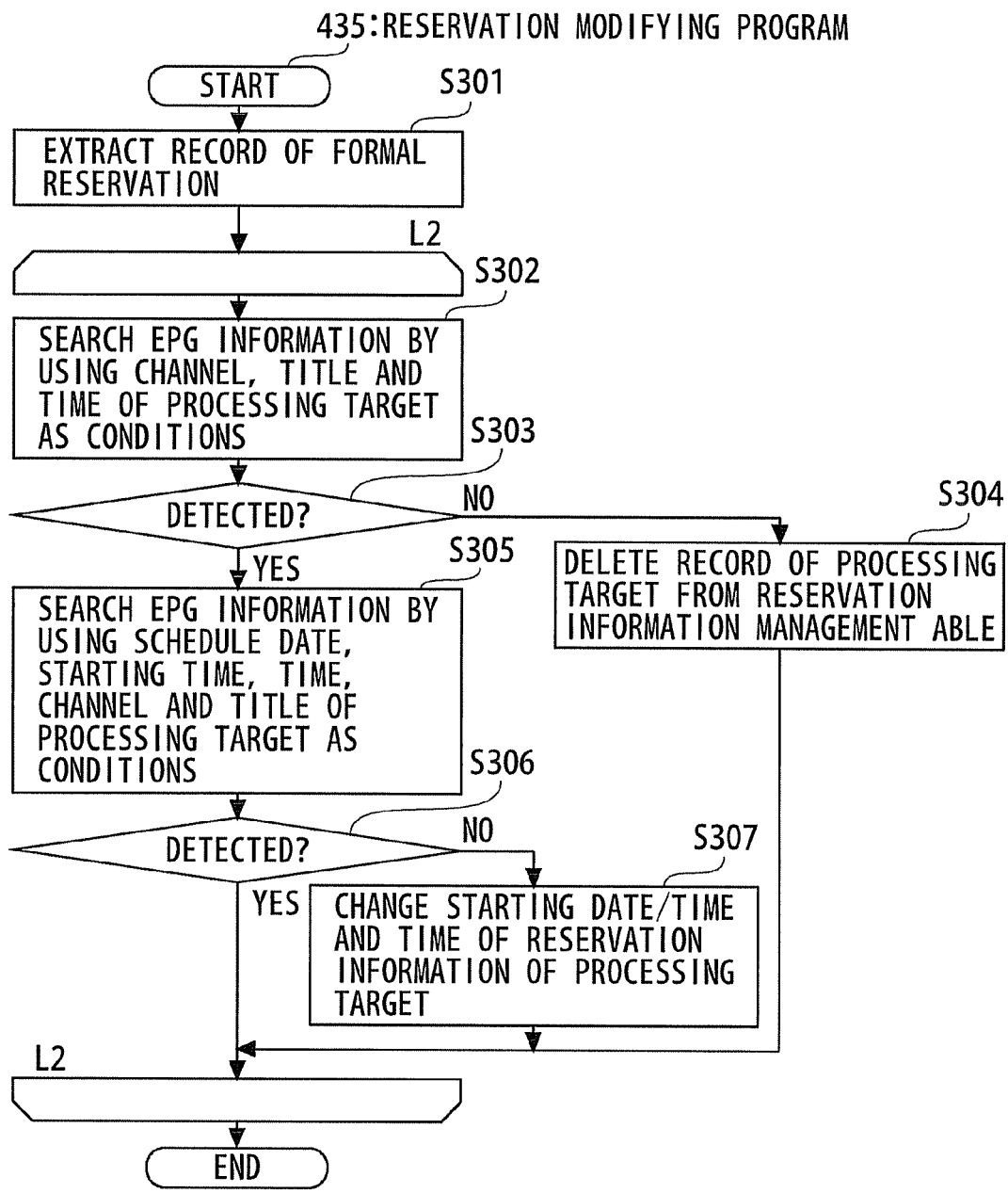
FIG. 12 is a flowchart illustrating a flow of a reservation modifying process.

FIG. 12 is a flowchart illustrating the reservation modifying process.

After starting the reservation modifying process, in first step S301, the CPU 40k extracts a record containing none of the temporary reservation information from the reservation information management table 43d in FIG. 4. Thereafter, the CPU 40k executes a second processing loop L2.

In the second processing loop L2, the CPU 40k executes a process consisting of steps S302 through S307 sequentially with respect to each of the records extracted in step S301 from within the reservation information management table 43d in FIG. 4.

In step S302, the CPU 40k searches through the EPG information in a way that uses the channel, the title and the time in the processing target record as the conditions for search.

In next step S303, the CPU 40k determines based on the result of the search in step S302 whether the program information can be detected from the EPG information or not. Then, when the program information can not be detected from the EPG information, the CPU 40k diverts the process from step S303 to step 304.

In step S304, the CPU 40k deletes the processing target record from the reservation information management table 43d in FIG. 4. Incidentally, in the case of thus deleting the reservation information, an available scheme is that this purport is recorded in an arbitrary area on the storage unit 40j and is read from the storage unit 40j when starting up the TV software 43, and the operator is notified of a purport that the recording reservation is cancelled. Thereafter, the CPU 40k finishes this round of the processing target in the second processing loop L2.

While on the other hand, as the result of the search made in step S302, when the program information can be detected from the EPG information, the CPU 40k advances the process to step S305 from step S303.

In step S305, the CPU 40k searches through the EPG information in a way that uses the schedule date, the starting time, the time, the channel and the title in the processing target record as the conditions for search.

In next step S306, the CPU 40k determines based on the result of the search in step S305 whether the program information can be detected from the EPG information or not. Then, when the program information can be detected from the EPG information, the CPU 40k terminates this round of the processing target in the second processing loop L2. With this termination, it follows that the details of the recording reservation concerning the processing target record are not changed. Whereas when the program information can not be detected from the EPG information, the CPU 40k diverts the process to step S307 from step S306.

In step S307, the CPU 40k overwrites the broadcasting date, the broadcasting starting time and the broadcasting time in the program information detected by the search in step S303 with the schedule date, the starting time and the time in the processing target record. The details of the recording reservation related to the processing target are thereby changed. Incidentally, in the case of thus changing the details of the reservation, an available scheme is that this purport is included in the processing target record and is read from the reservation information management table 43d when starting up the TV software 43, and the operator is notified of the purport that the details of the recording reservation have been changed. Thereafter, the CPU 40k finishes this round of the processing target in the second processing loop L2.

The CPU 40k, after executing the process consisting of steps S302 through S307 with respect to all of the records in the reservation information management table 43d in FIG. 4, exits the second processing loop L2, and terminates the reservation modifying process in FIG. 12.

<<Operational Effect>>

In the television PC 40 of the embodiment, when the effectiveness of the auto detection function is defined in the setting information 431, when the in-broadcasting content of the channel designated by the operator starts being output immediately to the output device 40a, the program advertisement scheduled to be broadcasted by the TV broadcasting station is automatically searched for from within the pictures organizing this content (steps S101, S102; Yes, S103, S131, S133, S134; No, S135, S136) Then, upon the detection of the program advertisement, a procedure of the formal reservation or the temporary reservation for recording the program is performed corresponding to the existence/non-existence of the EPG information associated therewith (step S134; Yes, S137, S106, S107-S109). The procedure of the formal reservation or the temporary reservation involves presenting the program information of the program pertaining to the detected program advertisement to the viewer (operator), making the query about the formal reservation or the temporary reservation for recording the program (steps S181, S191), conducting the formal reservation or the temporary reservation according to an instruction given from the viewer (operator) (step S182; Yes, S183, S192; Yes, S193). Therefore, the viewer of the TV broadcast, when the broadcasted program advertisement contains a viewer's favorite, can reserve the recording of this program simply by giving an executing instruction about the queried reservation.

Further, the EPG normally contains the program information related to the programs of one week or two weeks ahead.

Hence, even when detecting the program advertisement of a program scheduled to be broadcasted further ahead of these time-spans, only the temporary reservation is to be made. The television PC 40 in the embodiment collates the reservation information on the temporary reservation with the EPG information on demand, and reregisters the reservation into the formal reservation with respect to the recording with the temporary reservation (steps S201-S205). Hence, according to the embodiment, the recording of the program scheduled to be broadcasted subsequent to one or two weeks ahead can be reserved.

Moreover, the broadcasting schedule time and date of the program scheduled to be broadcasted by the TV broadcasting station might be changed in case of occurrences of a war, an earthquake, a conflict and a disaster and due to congratulations and condolences of the VIPs, or an election. The television PC 40 in the embodiment checks whether the broadcasting schedule time and date with respect to the recording with the formal reservation made is changed or not (steps S301, S302, S303; Yes, S305) and, when the broadcasting schedule time and date is changed, changes also the details of the reservation for the recording (step S306; No, S307). Therefore, according to the television PC 40 of the embodiment, after the recording of an arbitrary program has been reserved, even when the broadcasting schedule time and date of the program is changed by the TV broadcasting station, it follows that the details of the reservation for the recording are automatically changed.

<<First Modified Mode>>

Note that the television PC 40 in the embodiment is the personal computer with the addition of the function for receiving the TV signals transmitted by the broadcasting station and outputting/recording the broadcasted pictures. The television PC in the embodiment is just one embodiment, and whatever type of device equipped with the recording unit for saving the content broadcasted by the broadcasting station as the moving picture data on the recording medium is available in terms of carrying out this case. Such a device can be exemplified by a video recorder such as a DVD [Digital Versatile Disk] recorder and a hard disk recorder.

<<Second Modified Mode>>

Further, the television PC 40 in the embodiment acquires the text data from one-frame image data (steps S131, S132, S151, S152), then specifies the CM information having the predetermined degree of coincidence with the text data from within the plural items of CM information (step S133, S134; Yes, S137, S153, S154; Yes, S157), and collates the specified CM information with the EPG information (step S106).

The target, of which the degree of coincidence with the text data is calculated, may not be, however, limited to the CM information such as this. For example, the television PC 40 may accumulate the titles of the programs of which the recording was reserved in the past in an unillustrated database, acquire the text data from the one-frame data, then detect the title of the program having the predetermined or higher degree of coincidence with the text data from the unillustrated database, and collate the detected title and the date contained in the text data with the EPG information.

Moreover, the television PC 40 in the embodiment may also acquire the text data from the one-frame image data, specify a Web page having the predetermined or higher degree of coincidence with the text data from the Web site of the TV broadcasting station which broadcasts the content concerned, acquires the title of the program from a URL [Uniform Resource Locator] of the Web page, and collate the acquired title and the time and date contained in the text data with the EPG information.

<<Third Modified Mode>>

Further, the television PC 40 in the embodiment presents the program advertisement being detected to the operator, and reserves the recording of the program in accordance with the instruction given from the operator. This scheme is effective in preventing the unnecessary program from being recorded. The recording of the program may also be, however, made without conducting the presentation to the operator such as this. With this contrivance, it follows that the operator's time-consuming operation of reserving the recording is further reduced.

<<Explanations of Units>>

In the embodiment discussed above, the respective units 40a-40l within the television PC 40 may each be constructed of a software component and a hardware component and may also be constructed of only the hardware component.

The software component can be exemplified by an interface program, a driver program, a table and data and by a combination of some of these components. These components may be stored on a readable-by-computer medium that will be explained later on and may also be firmware that is fixedly incorporated into a storage device such as a ROM [Read Only Memory] and an LSI [Large Scale Integration].

Moreover, the hardware component can be exemplified by an FPGA [Field Programmable Gate Array], an ASIC [Application Specific Integrated Circuit], a gate array, a combination of logic gates, a signal processing circuit, an analog circuit and other types of circuits. Among these components, the logic gate may include an AND, an OR, a NOT, a NAND, a NOR, a flip-flop, a counter circuit and so on. Moreover, the signal processing circuit may include circuit elements which execute addition, multiplication, subtraction, inversion, a sum-of-products operation, differentiation and integration of signal values. Further, the analog circuit may include circuit elements which execute amplification, addition, multiplication, differentiation, integration, etc.

Note that the components building up the units 40a-40l within the television PC 40 described above are not limited to those exemplified above but may be other components equivalent thereto.

<<Explanation about Software and Program>>

In the embodiment discussed above, the TV software 43 in the television PC 40, the respective modules 43-43c, 43e, 43g and the respective tables 43d, 43f which build up the TV software 43 and the software components described above, may each include a software component, a procedure-oriented language based component, an object-oriented software component, class component, a component managed as a task, a component managed as a process, and elements such as a function, an attribute, a procedure (Procedure), a subroutine (software routine), a fragment or segment of a program code, a driver, firmware, a microcode, a code, a code segment, an extra segment, a stack segment, a program area, a data area, data, a database, a data structure, a field, a record, a table, a matrix table, an array, a variable and a parameter.

Further, the TV software 43 in the television PC 40, the respective modules 43-43c, 43e, 43g and the respective tables 43d, 43f which build up the TV software 43 and the software components described above, may each be described in a C-language, C++, Java (trademark of Sun Microsystems in U.S.A.), Visual basic (trademark of Microsoft Corp. in U.S.A.), Perl, Ruby and other programming languages.

Moreover, the instruction, the code and the data contained in the TV software 43 in the television PC 40, the respective modules 43-43c, 43e, 43g and the respective tables 43d, 43f which build up the TV software 43 and the software components described above, may be transmitted to or loaded into a computer and a computer incorporated into a machine or a system via a wired network card and a wired network or via a wireless card and a wireless network.

In the transmission or loading described above, the data signals flow via the wired network or the wireless network in the way of their being carried on, e.g., carrier waves. The data signals may also be, however, transferred intact as so-called baseband signals without depending on the carrier waves described above. These carrier waves are transmitted in an electric, magnetic or electromagnetic mode, an optical mode, an acoustic mode or other modes.

Herein, the wired network or the wireless network is a network built up by, e.g., a telephone line, a network line, a cable (including an optical cable and a metallic cable), a wireless link, a mobile phone access line, a PHS [Personal Handyphone System] network, a wireless LAN [Local Area Network], Bluetooth (trademark of the Bluetooth Special Interest Group), on-vehicle wireless type communications (including DSRC [Dedicated Short Range Communication]) and a network constructed of any one of those given above. Then, the data signals are used for transmitting the information including the instruction, the code and the data to a node or the component on the network.

Note that the components configuring the TV software 43 in the television PC 40, the respective modules 43-43c, 43e, 43g and the respective tables 43d, 43f which build up the TV software 43 and the software components described above, are not limited to those exemplified above and may also be other components equivalent thereto.

<<Explanation about Readable-by-Computer Medium>>

Any one of the functions in the embodiment discussed above may be coded and thus stored in a storage area on the readable-by-computer medium. In this case, the program (program includes instructions of Computer) for realizing the function can be provided to the computer or the computer incorporated into the machine or the system via the readable-by-computer medium. The computer or the computer incorporated into the machine or the system reads the program from the storage area on the readable-by-computer medium and executes the program, thereby enabling the function thereof to be realized.

Herein, the readable-by-computer medium connotes a recording medium capable of accumulating information such as the program and the data by electrical, magnetic, optical, chemical, physical or mechanical action, and retaining the information in a readable-by-computer status.

The electrical or magnetic action can be exemplified by writing the data to the element on the ROM [Read Only Memory] constructed by use of a fuse. The magnetic or physical action can be exemplified by a phenomenon of toners to form a latent image on a paper medium. Note that the information recorded on the paper medium can be read, e.g., optically. The optical and chemical action can be exemplified by forming a thin film or a rugged portion on a substrate. Incidentally, the information recorded in the ruggedness-utilized mode can be read, e.g., optically. The chemical action can be exemplified by oxidation-reduction reaction on the substrate or forming an oxide film or a nitride film on a semiconductor substrate, or a photo-resist phenomenon. The physical or mechanical action can be exemplified by forming a rugged portion on an emboss card or forming a punch-hole in the paper medium.

Moreover, in the readable-by-computer mediums, some mediums can be detachably attached to the computer or the computer incorporated into the machine or the system. The attachable/detachable readable-by-computer medium can be exemplified by a DVD (including DVD-R, DVD-RW, DVD-ROM, DVD-RAM), a +R/+WR, a BD (including BD-R, BD-RE, BD-ROM), a CD [Compact Disk] (including CD-R, CD-RW, CD-ROM), an MO [Magneto Optical] disk, other optical disk mediums, a flexible disk (including a floppy disk (Floppy is a trademark of Hitachi Ltd.)), other magnetic disk mediums, a memory card (CompactFlash (trademark of SanDisk Corp. in U.S.A.), SmartMedia (trademark of Toshiba Co., Ltd.), SD card (trademark of SanDisk Corp. in U.S.A., Matsushita Electric Industrial Co., Ltd. and Toshiba Co., Ltd.), Memory Stick (trademark of Sony Corp.), MMC (trademark of Siemens in U.S.A. and SanDisk Corp. in U.S.A.) etc), a magnetic tape and other tape mediums, and a storage device including, as a built-in component, any one of those mediums. Some of the storage devices include a built-in DRAM [Dynamic Random Access Memory] or SRAM [Dynamic Random Access Memory].

Furthermore, some of the readable-by-computer mediums are fixedly installed in the computer or the computer incorporated into the machine or the system. This type of readable-by-computer medium can be exemplified by a hard disk, a DRAM, an SRAM, a ROM, an EEPROM [Electronically Erasable and Programmable Read Only Memory] and a flash memory.

As broadly known, a TV broadcasting station in a private sector broadcasts an advertisement at an interval of broadcasting programs. The advertising broadcast is called a CM [Commercial Message], a TV commercial and a CF [Commercial Film], in which details thereof are advertisements of commercial articles or services provided to consumers by general enterprises and public relations (PR) of a government etc in many cases, however, the advertising broadcast might be an advertisement of a program scheduled to be broadcasted. A viewer of the TV broadcast can, when a favorite (program) is contained in the advertisements of the broadcasted programs, view this favorite program in a way that stores a broadcast schedule time and date and a channel of broadcasting the program advertisement which are notified during the program advertisement, and manually designates the broadcast schedule time and date and the channel with the aid of a recording function of a recording device (video recorder) or a so-called television personal computer or searches for the relevant program from within a TV program guide based on EPG [Electronic Program Guide] information to thereby reserve the recording of the advertised program. The manual operation of designating the broadcast schedule time and date and the channel and the operation of searching for the relevant program from within the TV program guide are highly time-consuming to the viewers.

According to the embodiment, the computer operates to, in the case of acquiring the program information for specifying the advertised program from within the pictures (video) based on the TV signals, register the reservation information based on the program information in the reservation information management table. Therefore, it follows that the recording of the program advertised in the advertisement broadcast is simply reserved.

It may be noted that the operation related to the recording reservation program disclosed above can be realized by a recording reservation method or a recording reservation device. Namely, this case may be a recording reservation method by which the computer executes, as a plurality of steps, the same functions as those of the respective unit of the recording reservation program described above, and may also be a recording reservation device including a plurality of unit functioning in the same way as these unit function. Further, this case may also be a readable-by-computer medium stored with the recording reservation program.

From what has been described so far, this case invention enables the recording of the program advertised in the advertisement broadcast to be simply reserved without taking any time-consuming operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable recording medium that records reservation instructions for reserving recording that is executed by recording unit to save a picture based on television signals as video data on a recording medium, the instructions making a computer function as:
   an acquiring unit to acquire program information for specifying an advertised program from within the picture based on the television signals of any one of channels;
   a registering unit to register reservation information based on the program information acquired by the acquiring unit in a reservation information management table stored with the reservation information containing information for specifying a time and date and a channel at which the recording unit performs the recording;
   a second searching unit to search the reservation information for reservation information specifying a program coincident with none of programs specified by pieces of program information distributed for an EPG (Electronic Program Guide) from within the reservation information management table each time the EPG information is updated; and
   a deleting unit to delete, when the second searching unit detects the reservation information, the detected reservation information from the reservation information management table;
   wherein, when the reservation information is deleted, information on deletion of the reservation information is recorded in an arbitrary area on a storage unit, is read from the storage unit and is displayed on a display.

2. The non-transitory computer-readable recording medium according to claim 1, wherein the computer is made to further function as query unit to query a viewer of the picture about the reservation for recording the program specified by the program information acquired by the acquiring unit, and the registering unit, when receiving an execution instruction from the viewer with respect to the reservation about which the query unit queries, registers the reservation information based on the program information acquired by the acquiring unit in the reservation information management table.

3. The non-transitory computer-readable recording medium according to claim 1, wherein the acquiring unit executes a character recognizing process with respect to one frame of image selected from within plural frames of images organizing the picture to thereby read a text from the image and, when the readout text contains a text which specifies the advertised program, acquires the program information based on this text.

4. The non-transitory computer-readable recording medium according to claim 1, wherein the registering unit searches for the program information for specifying the same program as by the program information acquired by the acquiring unit from within the program information distributed for the EPG and, when the program information is detected, registers the reservation information based on this program information in the reservation information management table.

5. The non-transitory computer-readable recording medium according to claim 1, wherein the registering unit searches for the program information for specifying the same program as by the program information acquired by the acquiring unit from within the program information distributed for the EPG and, when the program information is not detected, the registering unit adds temporary reservation information representing a temporary reservation to the reservation information based on this program information and registers the reservation information management table to which the temporary reservation information is added.

6. The non-transitory computer-readable recording medium according to claim 5, wherein the computer is made to further function as: first searching unit to search for reservation information for specifying the same program as one of plural pieces of program information having the addition of the temporary reservation information representing the temporary reservation and distributed for the EPG; and reregistering unit to reregister the reservation information into a formal reservation by deleting, when the first searching unit detects the reservation information, the detected reservation information from the reservation information management table, and to register, in the reservation information management table, the program information for specifying the same program as by the detected reservation information in the pieces of program information distributed for the EPG.

7. The non-transitory computer-readable recording medium according to claim 1, wherein the computer is made to further function as: second searching unit searching for the reservation information for specifying a program coincident with none of the programs specified by the pieces of program information distributed for the EPG from within the reservation information management table; and updating unit to overwrite, when the second searching unit detects the reservation information and when the program information for specifying a program matching with only a channel and a title of the program specified by the detected reservation information exists in the pieces of program information distributed for the EPG, the reservation information based on this program information with the reservation information detected by the second searching unit.

8. A recording reservation method for reserving recording that is executed by recording unit to save a picture based on television signals as video data on a recording medium, by which a computer executes:
   acquiring program information for specifying an advertised program from within the picture based on the television signals of any one of channels;
   registering reservation information based on the program information acquired in the acquiring in a reservation information management table stored with the reservation information containing information for specifying a time and date and a channel at which the recording is performed in the recording;
   second searching the reservation information for reservation information specifying a program coincident with none of programs specified by pieces of program information distributed for an EPG (Electronic Program Guide) from within the reservation information management table each time the EPG information is updated; and deleting, when the reservation information is detected in the second searching, the detected reservation information from the reservation information management table, wherein, when the reservation information is deleted, information on deletion of the reservation information is recorded in an arbitrary area on a storage unit, is read from the storage unit and is displayed on a display.

9. The recording reservation method according to claim 8, wherein the computer further executes querying a viewer of the picture about the reservation for recording the program specified by the program information acquired in the acquiring, and the registering includes, when receiving an execution instruction from the viewer with respect to the reservation about which to query in the query, registering the reservation information based on the program information acquired in the acquiring in the reservation information management table.

10. The recording reservation method according to claim 8, wherein the acquiring includes executing a character recognizing process with respect to one frame of image selected from within plural frames of images organizing the picture to thereby read a text from the image and, when the readout text contains a text which specifies the advertised program, acquiring the program information based on this text.

11. The recording reservation method according to claim 8, wherein the computer, in the registering, searches for the program information for specifying the same program as by the program information acquired in the acquiring from within the program information distributed for the EPG and, when the program information is detected, registers the reservation information based on this program information in the reservation information management table.

12. The recording reservation method according to claim 8, wherein the computer, in the registering, searches for the program information for specifying the same program as by the program information acquired in the acquiring from within the program information distributed for the EPG and, the registering unit adds temporary reservation information representing a temporary reservation to the reservation information based on this program information and registers the reservation information management table to which the temporary reservation information is added.

13. The recording reservation method according to claim 12, wherein the computer further executes: searching for reservation information for specifying the same program as one of plural pieces of program information having the addition of the temporary reservation information representing the temporary reservation and distributed for the EPG; and reregistering the reservation information into a formal reservation by deleting, when the reservation information is detected in the searching, the detected reservation information from the reservation information management table, and registering, in the reservation information management table, the program information for specifying the same program as by the detected reservation program in the pieces of program information distributed for the EPG.

14. The recording reservation method according to claim 8, wherein the computer further executes: searching for the reservation information for specifying a program coincident with none of the programs specified by the pieces of program information distributed for the EPG from within the reservation information management table; and overwriting, when the reservation information is detected in the searching for the reservation information for specifying a program coincident with none of the programs specified by the pieces of program information distributed for the EPG and when the program information for specifying a program matching with only a channel and a title of the program specified by the detected reservation information exists in the pieces of program information distributed for the EPG, the reservation information based on this program information with the reservation information detected in the searching for the reservation information for specifying a program coincident with none of the programs specified by the pieces of program information distributed for the EPG.

15. A recording reservation device for reserving recording that is executed by recording unit saving a picture based on television signals as video data on a recording medium, comprising:

an acquiring unit to acquire program information for specifying an advertised program from within the picture based on the television signals of any one of channels;

a registering unit to register reservation information based on the program information acquired by the acquiring unit in a reservation information management table stored with the reservation information containing information for specifying a time and date and a channel at which the recording unit performs the recording;

a second searching unit to search the reservation information for reservation information specifying a program coincident with none of programs specified by pieces of program information distributed for an EPG (Electronic Program Guide) from within the reservation information management table each time the EPG information is updated; and a deleting unit deleting, when the second searching unit detects the reservation information, the detected reservation information from the reservation information management table, wherein, when the reservation information is deleted, information on deletion of the reservation information is recorded in an arbitrary area on a storage unit, is read from the storage unit and is displayed on a display.

16. The recording reservation device according to claim 15, further comprising: a query unit query a viewer of the picture about the reservation for recording the program specified by the program information acquired by the acquiring unit, and the registering unit, when receiving an execution instruction from the viewer with respect to the reservation about which the query unit queries, registers the reservation information based on the program information acquired by the acquiring unit in the reservation information management table.

17. The recording reservation device according to claim 15, wherein the acquiring unit executes a character recognizing process with respect to one frame of image selected from within plural frames of images organizing the picture to thereby read a text from the image and, when the readout text contains a text which specifies the advertised program, acquires the program information based on this text.

18. The recording reservation device according to claim 15, wherein the registering unit searches for the program information for specifying the same program as by the program information acquired by the acquiring unit from within the program information distributed for the EPG and, when the program information is detected, registers the reservation information based on this program information in the reservation information management table.

19. The recording reservation device according to claim 15, wherein the registering unit searches for the program information for specifying the same program as by the program information acquired by the acquiring unit from within the program information distributed for the EPG and, when the program information is not detected, the registering unit adds temporary reservation information representing a temporary reservation to the reservation information based on this program information and registers the reservation information management table to which the temporary reservation information is added.

20. The recording reservation device according to claim 19, further comprising: a first searching unit searching for reservation information for specifying the same program as one of plural pieces of program information having the addition of the temporary reservation information representing the temporary reservation and distributed for the EPG; and a reregistering unit reregistering the reservation information into a formal reservation by deleting, when the first searching unit detects the reservation information, the detected reservation information from the reservation information management table, and registering, in the reservation information management table, the program information for specifying the same program as by the detected reservation program in the pieces of program information distributed for the EPG.

21. The recording reservation device according to claim 15, further comprising: a second searching unit searching for the reservation information for specifying a program coincident with none of the programs specified by the pieces of program information distributed for the EPG from within the reservation information management table; and an updating unit overwriting, when the second searching unit detects the reservation information and when the program information for specifying a program matching with only a channel and a title of the program specified by the detected reservation information exists in the pieces of program information distributed for the EPG, the reservation information based on this program information with the reservation information detected by the second searching unit.

* * * * *

UNITED STATES PATENT AND TRADEMARK OFFICE
CERTIFICATE OF CORRECTION

PATENT NO. : 8,670,652 B2  
APPLICATION NO. : 12/553298  
DATED : March 11, 2014  
INVENTOR(S) : Yai et al.

It is certified that error appears in the above-identified patent and that said Letters Patent is hereby corrected as shown below:

In the Claims

Column 17, Line 42, In Claim 1, delete "table;" and insert -- table, --, therefor.

Signed and Sealed this  
First Day of July, 2014

Michelle K. Lee  
*Deputy Director of the United States Patent and Trademark Office*